May 17, 1966  C. E. COOKE, JR., ETAL  3,251,412
METHOD OF OIL RECOVERY
Filed Jan. 7, 1963  2 Sheets-Sheet 1

INVENTORS.
CLAUDE E. COOKE, JR.,
WILLIAM O. BROWN,
BY FREDERICK M. PERKINS, JR.,

ATTORNEY.

May 17, 1966    C. E. COOKE, JR., ETAL    3,251,412
METHOD OF OIL RECOVERY
Filed Jan. 7, 1963    2 Sheets-Sheet 2

INVENTORS.
CLAUDE E. COOKE, JR.,
WILLIAM O. BROWN,
BY FREDERICK M. PERKINS, JR.,

ATTORNEY.

3,251,412
METHOD OF OIL RECOVERY
Claude E. Cooke, Jr., Englewood Cliffs, N.J., William O. Brown, Houston, Tex., and Frederick M. Perkins, Jr., Darien, Conn., assignors, by mesne assignments, to Esso Production Research Company, Houston, Tex., a corporation of Delaware
Filed Jan. 7, 1963, Ser. No. 249,807
8 Claims. (Cl. 166—9)

The present invention concerns a method for the production of oil from watered-out sands.

Generally, the oil recovered at the end of a natural or artificial water drive of an oil formation is considered to be the maximum amount recoverable by water displacement, although much of the original oil in place, e.g., 20 to 50 percent, is still in the ground at this time.

A primary object of this invention is to provide an improved method for recovering a major part of this trapped or residual oil remaining in the oil sands following a water drive.

It has been found that it is possible to replace the formation water with specially treated water in a manner such that the residual oil is not displaced during the replacement of the formation water. It has also been found that by replacing formation water with specially treated water without displacing the oil, ready segregation of the oil and the treated water occurs and the oil migrates to and collects in the upper portions of the reservoir. In this method, the residual oil must have an acid number greater than 0.3 and the displacing treated water must have a selected pH and salinity and contain ions for precipitating bivalent cations such as magnesium and calcium from the water when they are present. In practice, the exact alkalinity and salinity of the water are chosen experimentally relative to the acidity of the reservoir oil as will be described below. The treated alkaline salt water is then introduced into the reservoir where it displaces formation water; then injection of the treated water is halted and the well is shut in for a preselected time interval sufficient in length to permit the residual oil to migrate and collect in the upper portions of the formation. The collected oil is then produced, either through a well spaced apart from the well through which the treated water is introduced or through the same well through which the treated water is introduced. If the production well is not located in proper relation to, i.e., at or near the crest of the structure, (and a natural gas cap does not exist) an attic oil recovery type process in which gas is injected to move the oil down to the producing well may be employed; or preferably, the formation water may be moved down to the producing well by the injected gas prior to replacement of it by the treated water. Formation water displaced by the treated water may be removed by producing it or alternately, the formation water may be displaced or pushed back into the formation away from the wells.

The acid number of an oil is defined for purposes herein as the number of milligrams of potassium hydroxide required to neutralize one gram of oil. It is determined by a standard ASTM technique designated D–664–54, "Neutralization Value by Potentiometric Titration."

After the formation water is replaced with the treated alkaline salt water and the production and injection wells (or well) are shut in, the oil and water segregate under the influence of gravity. The residual oil flows at a relatively low rate in a more or less vertical direction. However, if the reservoir is somewhat tilted from the horizontal, after a high oil saturation has been built up along the entire length and in the upper part of the reservoir, the rate of oil movement along the top of the reservoir will be much greater. After oil accumulates on the up-dip section of the reservoir, untreated water may be injected through down-dip wells and oil produced from the structure's crest in the manner of a normal waterflood operation.

The treated water to be injected is treated at the surface in conventional water treating facilities to provide water of the correct properties to give good oil recovery. These properties are:

The pH and salt content of the treated alkaline water must be adjusted to give low interfacial tension and preferential oil wetting of the rocks. To obtain such oil wetting, the salinity of the alkaline water should be in the range of from about 0.6 to 5 normal and the pH should be between about 8 to 13. Preferred ranges are salinity of from 0.6 to 3 normal and pH of from 9.5 to 12.5. To control the concentrations of the bivalent cations, materials such as soda ash or ammonium phosphate must be added in proper amounts. Precipitation of the bivalent cations is necessary to achieve the desired low, interfacial tensions their presence would prevent.

The above noted object and other objects and advantages of the invention will be apparent from a more detailed description thereof when taken in conjunction with the drawings wherein.

For a more complete description of the invention, reference is made to the drawings in greater detail.

Figure 1:
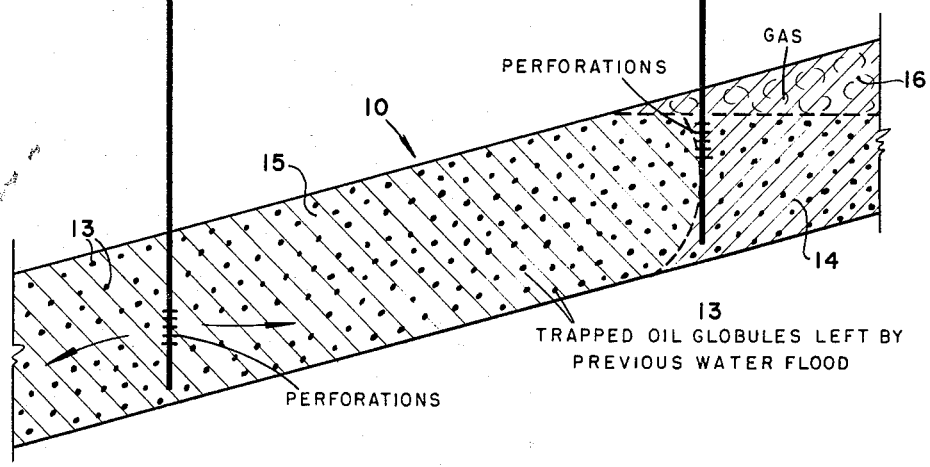
FIG. 1 is a diagrammatic, vertical section of the earth's subsurface showing a previously flooded oil formation flooded with treated water and penetrated by two wells.
Figure 2:
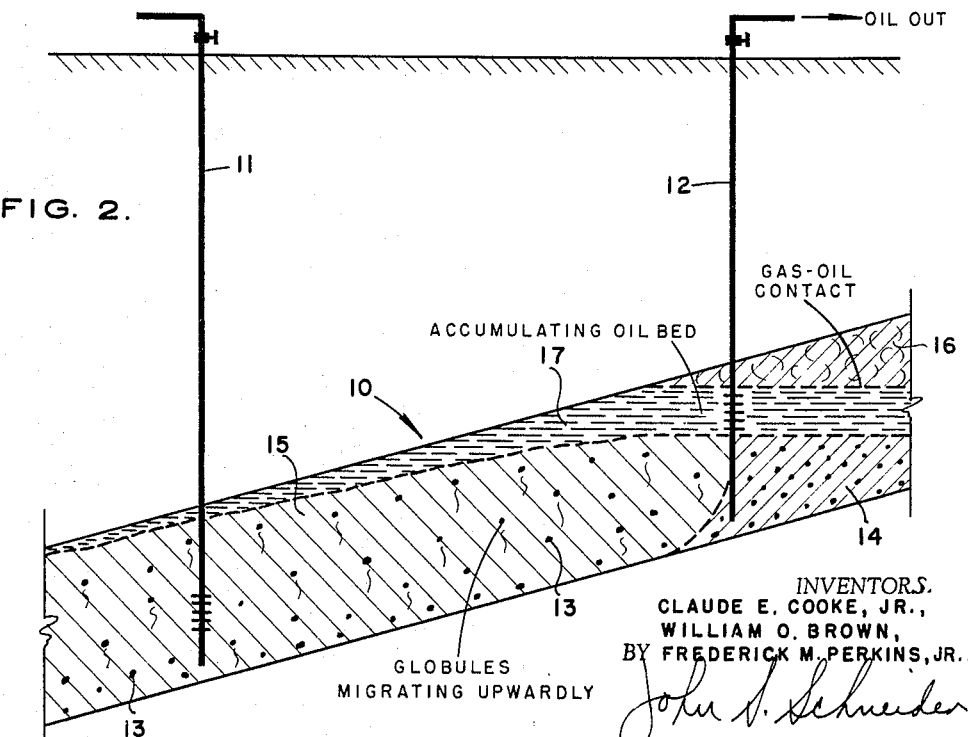
FIG. 2 is a view similar to that shown in FIG. 1 illustrating the oil production operation following treated water flooding and oil migration.

A tilted formation 10 penetrated by water injection and production wells 11 and 12 is shown in FIGS. 1 and 2. Formation 10 represents the watered-out sands of an oil formation swept by a water drive. Trapped globules of oil 13 are shown surrounded by formation water 14 above production well 12. As seen in FIG. 1 alkaline water 15 has replaced the formation water below production well 15 and surrounds the oil globules 13 in place of the formation water. The displacing alkaline water was injected through well 11 while the displaced formation water was produced through well 12. Alternatively, the formation water could have been moved back into the formation and not produced. A gas zone 16 has been formed in reservoir 10 by injecting gas into the formation through well 12 to locate the accumulated oil zone 17 (see FIG. 2) resulting from oil migration adjacent well 12. Gas zone 16 could have been formed following instead of prior to migration and accumulation of oil. FIG. 2 illustrates migration of oil globules 13 and accumulation of oil zone 17 during a waiting period following replacement of the formation water. The accumulated oil is produced through well 12.

Figure 3:
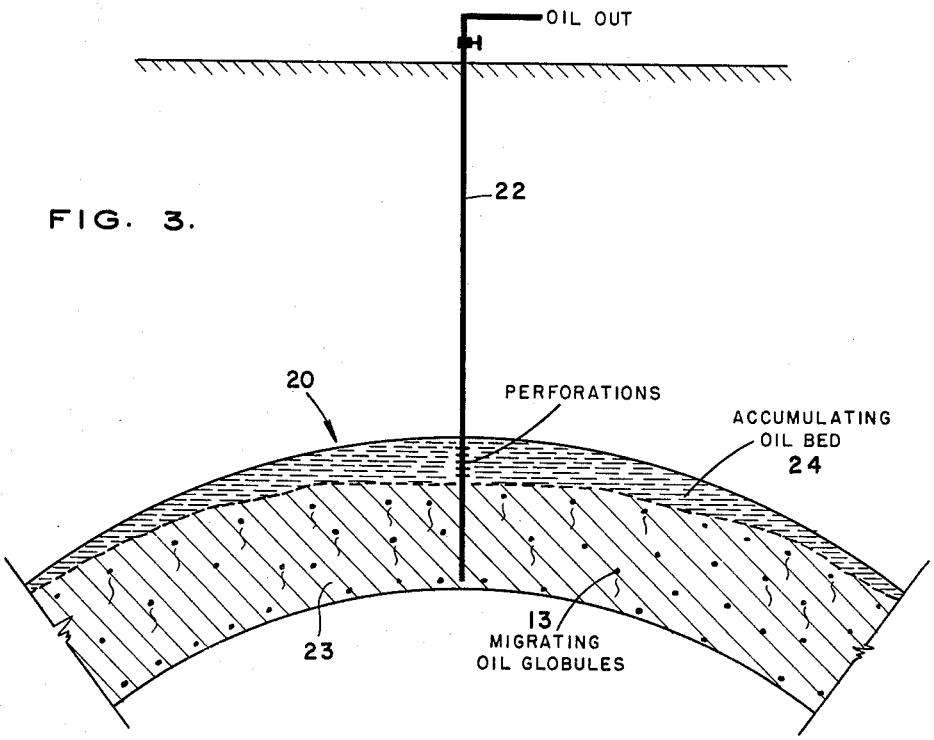
FIG. 3 is a view similar to that of FIG. 2 except a differently configured formation and only one well are shown.

A domed structure 20 penetrated by a single well 22 is illustrated in FIG. 3. The formation water has been displaced by treated alkaline water 23 injected through well 22. The residual oil globules 13 initially trapped by the formation water migrate upwardly to the crest of the structure during a waiting period to form an oil zone 24 which is produced through well 22.

A series of experiments were performed to illustrate the practice of the invention. The first series of experiments, synthetic oil-gravity drainage, show the general operation of, including advantages achieved by, the process.

SYNTHETIC OIL-GRAVITY DRAINAGE EXPERIMENTS

*Experiment 1.*—A column was packed with an unconsolidated sand having a permeability of approximately 2 darcies and saturated with 1.0 N sodium chloride solution and then flooded to low water content with 1 percent oleic acid in kerosene. The acid number of this oil was 2.0. It was then flooded to residual oil with 1.0 N sodium chloride solution. Residual oil was approximately 18 percent pore volume. Treated alkaline water was then injected, having a pH of 8.58 and 1.0 N sodium chloride and 0.05 N $H_3BO_3$, 0.05 M $Na_2CO_3$, and 3 g./l. of ammonium phosphate. Boric acid was added as a buffer to maintain a pH of 8.58. This water was injected at the rate of 5 feet per day. A small amount of oil was produced and the residual oil then equaled approximately 13 percent pore volume. The column was placed vertically for 5½ months, and a high oil saturation was observed down to 5 centimeters from the top of the column. A 1.0 N sodium chloride solution was then injected and oil produced as a result thereof, after which the residual oil equaled 9 percent pore volume. The column was allowed to stand vertically for a total lapsed time of 6.3 months. Then more of the 1.0 N sodium chloride solution was injected, and oil was produced, which resulted in a residual oil of 8.8 percent pore volume. This procedure was repeated at 8.3 months and 9.0 months. The results are shown in the following Table I:

*Table I*

| Residual oil percent pore volume | Percent residual oil collected | Time, months |
|---|---|---|
| 13.0 | 0.0 | 0.0 |
| 9.0 | 32.3 | 5.5 |
| 8.8 | 34.3 | 6.3 |
| 7.6 | 42.7 | 8.3 |
| 6.8 | 48.8 | 9.0 |

Figure 4:
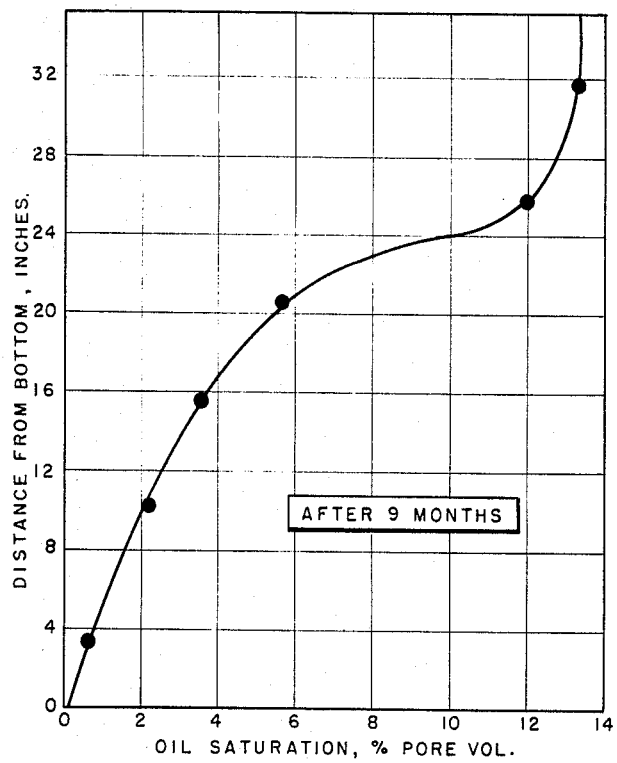
FIG. 4 is a plot of oil saturation v. distance from the bottom of a column for one of the experiments used to illustrate the invention.

The distribution of oil within the same column after it had stood in a vertical position for 9 months is shown in FIG. 4. The oil saturations were determined by pushing the sand from the column, separating it into six samples as it emerged from the column, and vacuum distilling the oil and water from each sample. It can easily be seen in FIG. 4 that the oil was migrating upward through the sand and that very low oil saturations were attained in the lower part of the sand body.

To illustrate the effect of the presence of undesirable cations, other experiments were conducted using the same procedure as was used in Experiment 1, but with the water composition changed as follows: the water did not contain the carbonate or phosphate, and 200 p.p.m. of calcium ion was added. No gravity drainage of oil occurred. Calcium and other multivalent cations cause a large increase of interfacial tension. Therefore, when these cations are present in the water, they must be kept to low concentrations for the process described here to be operative.

*Experiment 2.*—A 3-foot long column was packed with an unconsolidated sand having a permeability of 25 darcies. The column was prepared to contain 1.0 N sodium chloride solution as the connate water and kerosene containing 1 percent oleic acid as the oil phase (acid number of 2); the oil saturation equaled 84.9 percent, and the water saturation equaled 15.1 percent. A water-flood was then carried out using 1.0 N sodium chloride at a pressure gradient of 10 p.s.i. per foot. The residual oil saturation at the end of this flood was 14.6 percent pore volume. The column was then flooded with treated water at the rate of 2 feet per day, using a 1.0 N sodium chloride solution buffered to a pH of 8.4. The treated water injection displaced only 2.6 cc. of oil or 0.6 percent pore volume. The column was set aside, disposed in a vertical position. After 72 hours had elapsed, it was noticed that oil had migrated to the top of the column under the influence of gravity. This oil was produced by injecting some neutral salt water at the bottom of the column. After another 24 hours, more oil had accumulated, which was produced by injecting more salt water. At this time, the residual oil saturation was 6 percent pore volume. This procedure was continued, and after approximately two months, the residual oil saturation was less than 1 percent pore volume.

*Experiment 3.*—A 1-foot long column was packed with an unconsolidated sand having a permeability of 25 darcies. The column was prepared to contain a 1.0 N sodium chloride solution and oil containing 1 percent oleic acid. The column was flooded to residual oil by injecting 1.0 N sodium chloride solution. The residual oil saturation was 14.6 percent pore volume. Then alkaline salt water (1.0 N sodium chloride solution with pH varying slowly from 7.5 to 8.42 during the injection period) was injected. The final residual oil saturation was 14.6 percent pore volume. However, after the column stood in a vertical position for a period of four days, a large amount of oil collected at the top of the column. Thus, oil had continued to migrate under the influence of gravity. A small quantity of water was injected to remove the segregated oil, and after this, the residual oil saturation was reduced to 5.7 percent pore volume.

Another series of experiments, synthetic-centrifuge, were conducted to show that results obtainable with a centrifuge technique are comparable to the results obtained with the gravity drainage technique.

SYNTHETIC OIL-CENTRIFUGE EXPERIMENTS

To decrease the time required for experimentation, small Lucite columns designed to fit in the cups of a centrifuge were built. The small columns were packed with sand and prepared to residual oil saturation with 1 percent oleic acid in kerosene as the oil and 1.0 N sodium chloride solution as the water. Each column was then flooded with treated water consisting of a buffered solution containing 1.0 N sodium chloride, 0.05 M $H_3BO_3$, and 0.05 M $Na_2CO_3$ with HCl added to adjust the pH to 8.58. The columns were then placed in the centrifuge and centrifuged at approximately 450 r.p.m. This speed produced an acceleration of the columns about 40 times the acceleration of gravity, or an average pressure gradient between oil and water across the column 40 times that due to the gravity head. The oil displaced from the columns was measured in a tube attached to the top of the column. The results are shown in the following Table II:

*Table II*

| Column No. | Time in centrifuge minutes | Residual oil (percent pore volume) |
|---|---|---|
| 1 | 0 | 18.5 |
|   | 14 | 18.5 |
|   | 545 | 11.0 |
| 2 | 0 | 19.7 |
|   | 65 | 14.2 |
|   | 210 | 10.7 |
|   | 625 | 10.7 |
| 3 | 0 | 17.2 |
|   | 180 | 13.1 |
|   | 420 | 11.9 |
|   | 1,980 | 10.7 |

These data show that the centrifuge technique produces essentially the same results as those obtained by the force of gravity technique, but in a much shorter time.

A further series of centrifuge tests were carried out to show the procedure for selecting, and the limitations for, the optimum water composition and preferred acid content of the oil.

CRUDE OIL-CENTRIFUGE TESTS TO SELECT WATER pH AND UPPER SALINITY LIMIT

In these experiments a crude oil having a viscosity of about 4.3 centipoises, a density of about 0.85 at 135° F., and an acid number of 0.79 was used. All of the treated water solutions were buffered with $NaHCO_3$. The centrifuge cups were packed with sand and weighed before and after saturation with 1.0 N sodium chloride solution. The centrifuge cups and reservoirs of all fluids subsequently used were placed in a hot water bath at 135° F. The columns were flooded with about 1.5 pore volumes of crude oil, and the effluxed volume of water measured. Two pore volumes of 1.0 N sodium chloride followed by 2 pore volumes of the desired treated water reduced the oil in the column to residual oil saturation. Immediately after the alkaline waterfloods, the measuring columns were mounted and the centrifuge cups placed in the preheated centrifuge. The centrifugal acceleration at the center of the columns was 100 g. The results are tabulated in the following Table III.

Table III
PERCENT OIL RECOVERY AS RELATED TO pH AND SALINITY

| pH | Salinity: Normality Sodium Chloride | | | | | |
|---|---|---|---|---|---|---|
| | 1.0 | 1.5 | 2.0 | 3.0 | 4.0 | 5.0 |
| 8.0 | | | | | 28.0 | 28.0 |
| 8.5 | 8.0 | | | 25.0 | 23.0 | 21.0 |
| 9.0 | | | | | 15.0 | |
| 9.5 | 45.0 | 22.0 | 53.0 | 32.0 | | |
| 10.5 | 75.0 | 74.0 | 69.0 | 28.0 | | |
| 11.5 | 70.0 | 78.0 | 78.0 | 12.0 | | |
| 12.5 | 80.0 | | | | | |

The dashed line in Table III outlines conditions in which more than 20% of the residual oil is recovered. It is seen that a pH range from about 8 to 13 and a salinity ranging from about 1 to 5 normal provided this recovery. The preferred pH is shown to be about 9.5 to 12.5 and the preferred upper salinity limit is about 3 normal.

To determine the lower salinity limit of the water that will make possible gravity drainage of oil, experiments were performed using the crude oil of acid number 0.79. The results of a series of these experiments are shown in Table IV:

Table IV

| Water content | | Recovery percent residual oil |
|---|---|---|
| Salinity normal | pH | |
| 0 | 11.0 | 7 |
| 0.2 | 11.0 | 3 |
| 0.6 | 11.0 | 29 |
| 1.0 | 10.5 | 75 |
| 1.0 | 11.5 | 68 |

It is apparent that a salt content of at least about 0.6 N is necessary to achieve about 29% recovery; hence a salinity of about 0.6 normal represents the lower limit of salt concentration that should be used.

Thus, it is seen from both Tables III and IV that a desired salinity range is from about 0.6 to 5 normal with a preferred range from about 0.6 to 3 normal, while the pH is preferably in the range of 9.5 to 12.5.

ACID CONTENT OF OIL

Experiments were performed in the centrifuge with several crude oils which contained various amounts of naturally occurring acids. From these experiments it can be seen that there is a minimum acid content necessary for operation of the process, and this minimum is about 0.3 acid number. The results of these experiments are shown in the following Table V:

Table V

| Acid number of crude oil | Water composition | Recovery, percent residual oil |
|---|---|---|
| 0.30 | Various: 2N NaCl, pH 7.6 to 12.5 and 1 N NaCl, pH 8.5 to 9.5. | <10 |
| 0.42 | Salinity: 1 to 2 N, pH; 10 to 11.5 | 95 |
| 0.79 | 1.5 N NaCl, pH 11.5 | 78 |
| 1.00 | 2 N NaCl, pH 10.5 | 95 |
| 1.82 | 2 N NaCl, pH 10.5 | 80 |

The oil with an acid number of 0.3 showed slight increased recovery, whereas oil with an acid number of 0.42 was recovered in the amount of 95 percent of the residual after a water flood. Therefore, the minimum acid number of the oil is about 0.3.

Having fully described the nature, objects, and operation of our invention, we claim:

1. A method for recovering oil from watered-out portions of a surface oil formation containing residual oil having an acid number of at least 0.3 comprising the steps of:
   displacing formation water surrounding said residual oil with treated water introduced into said formation through a well penetrating said formation, said treated water having a pH in the range of about 8 to 13 and a salinity ranging between about 0.6 and 5 normal and containing ions for precipitating bivalent cations from the treated water;
   halting injection of the treated water and waiting for a preselected time interval sufficient in length to permit said residual oil to migrate and collect in the upper portions of said formation; and
   then producing said collected oil through a well penetrating said formation.

2. A method as recited in claim 1 in which said treated water has a pH in the range of 9.5 to 12.5 and a salinity in the range of about 0.6 to 3 normal.

3. A method as recited in claim 2 in which said injection and production wells are spaced apart, said formation is tilted, and said injection well is down-dip of said production well.

4. A method as recited in claim 3 in which said displaced formation water is produced through said production well.

5. A method for recovering oil from watered-out portions of a subsurface oil formation containing residual oil having an acid number of at least 0.3 comprising the steps of:
   displacing formation water surrounding said residual oil with treated water introduced into said formation through a well penetrating said formation, said treated water having a pH in the range of about 8 to 13 and a salinity ranging between about 0.6 and 5 normal and initially containing bivalent cations, said bivalent cations having been removed prior to introduction of the treated water into the formation;
   halting injection of the treated water and waiting for a preselected time interval sufficient in length to permit said residual oil to migrate and collect in the upper portions of said formations; and
   then producing said collected oil through a well penetrating said formation.

6. A method as recited in claim 5 in which said treated water has a pH in the range of 9.5 to 12.5 and a salinity in the range of about 0.6 to 3 normal.

7. A method as recited in claim 6 in which said injection and production wells are spaced apart, said formation is tilted, and said injection well is down-dip of said production well.

8. A method as recited in claim 7 in which said displaced formation water is produced through said production well.

References Cited by the Examiner
UNITED STATES PATENTS

| | | | |
|---|---|---|---|
| 1,651,311 | 11/1927 | Atkinson | 166—9 |
| 2,842,204 | 7/1958 | Horner | 166—9 |

CHARLES E. O'CONNELL, *Primary Examiner.*

C. H. GOLD, *Assistant Examiner.*